Figure 1:
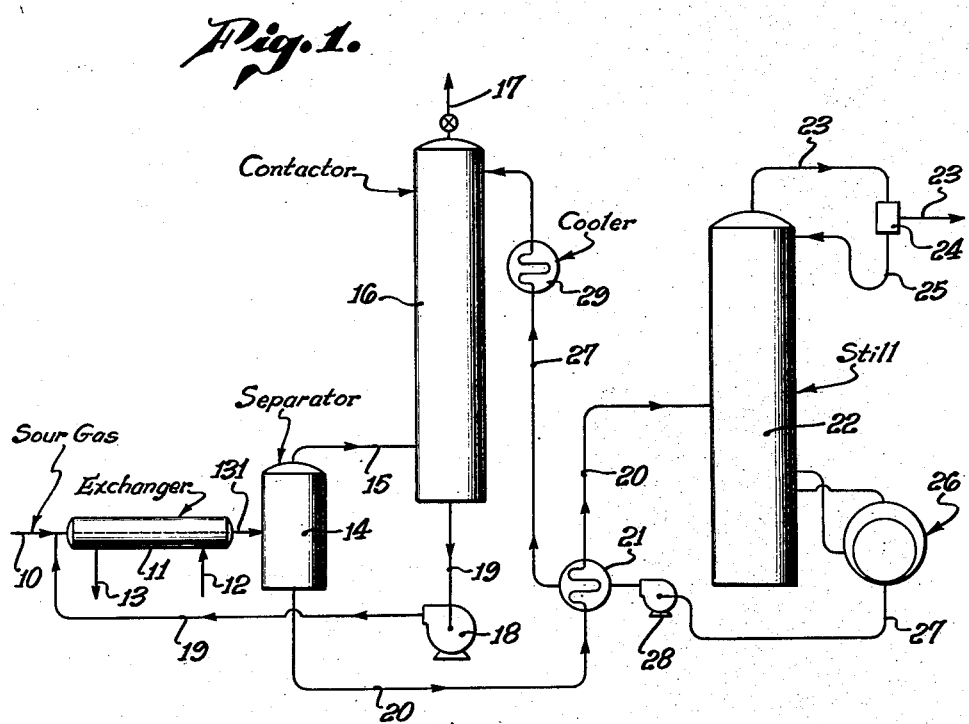

Aug. 19, 1952     I. C. BECHTOLD ET AL     2,607,657

EXTRACTION OF HIGH ACIDIC CONCENTRATIONS FROM GASES

Filed Dec. 27, 1948

IRA C. BECHTOLD,
ARTHUR L. KOHL,
INVENTORS.

BY

ATTORNEY.

Patented Aug. 19, 1952

2,607,657

UNITED STATES PATENT OFFICE 2,607,657

EXTRACTION OF HIGH ACIDIC CONCENTRATIONS FROM GASES

Ira C. Bechtold, Whittier, and Arthur L. Kohl, Los Angeles, Calif., assignors to The Fluor Corporation, Ltd., Los Angeles, Calif., a corporation of California Application December 27, 1948, Serial No. 67,385

8 Claims. (Cl. 23—2)

This invention has to do with the treatment of gaseous mixtures, typically hydrocarbon refinery gases, for the removal of acidic constituents such as hydrogen sulfide or both hydrogen sulfide and carbon dioxide. Particularly the invention is directed to the treatment of gases containing high concentrations of acidic constituents, e. g., refinery gases in which the hydrogen sulfide content may be as high as from 30 to 95 percent.

Generally considered, the invention contemplates treatment of the gas with a liquid absorbent reactive with the acidic constituents of the gas, and which may be regenerated, by heating, for reuse in a continuous cycle. Preferably we employ an organic amine absorbent which may contain any of the usual amines employed for gas treating, e. g., the ethanolamines, with or without other components such as glycol where dehydration is necessary, and as developed by past practices and in the literature, see Hutchinson Patent No. 2,177,068.

It is found that the customary processes are not applicable to the treatment of gases using treating solution concentrations or the acid gas-to-treating reagent concentrations herein contemplated, because of the heats of reaction released and the incapacities of the absorbent and residual gases to absorb the heat and still permit efficient absorption. Accordingly, our primary object is to provide for the use of abnormally high solution concentrations and acid gas-reagent concentrations conditions such that the heat of reaction is removed simultaneously with absorption, to a degree maintaining in the reaction zone temperatures permitting efficient absorption. As illustrative, the later described exchanger reactor type of equipment is applicable where it may be desired to use a concentrated amine solution (e. g. over 20% M. E. A.) and/or to absorb acid gas to a higher than usual acid gas to amine ratio (e. g. over 0.35). It is most feasible when the gas contains a high percentage of acid gas as the volume of gas phase is then reasonably small compared to the solution volume.

In accordance with the invention we first pass the gas through what may be considered generally as a first contacting zone, preferably one or more heat exchangers, within which the reacting gas and absorbent may have concurrent flow, as in a horizontal exchanger, or concurrent flow in a vertical exchanger. Simultaneously with the resulting reaction and removal from the gas of the bulk of its acidic content, the fluids are cooled by indirect heat transfer to a cooling medium such as water or other fluid. Thereafter, the residual gas and absorbent are separated, and the gas is given a further treatment by contact with lean absorbent in a second contacting zone which may consist of the usual counter flow contactor column.

The following example may be given as illustrative of a typical run: 194 SCF/hr. of gas containing 89.5% $H_2S$ and 10.5% hydrocarbon were treated with 0.1 gal./min. of 74% aqueous monoethanolamine solution concurrently in four single tube heat exchangers in series. Each exchanger consisted of 8 ft. of ¼ in. standard iron pipe with a 1 in. pipe jacket through which cooling water was circulated. The solution entering analyzed 0.03 mol of $H_2S$ per mol of M. E. A. After the first heat exchanger it was found to contain 0.46 mol $H_2S$ per mol of M. E. A., after the second 0.55, after the third 0.63 and after the fourth 0.68 mol $H_2S$ per mol of M. E. A. The mixture was then passed to a separator, the gas from which was found to contain 10.8% $H_2S$ and 98.7% hydrocarbon. This gas was contacted with the lean solution in a conventional packed column, which reduced the $H_2S$ content of the gas to approximately 0.02%. The rich solution was stripped continuously in a conventional still and reboiler, then recycled through the column and the exchanger in series.

Either the same or separate streams of absorbent may be used for treatment of the gas in the two zones. As illustrative of a single stream system the lean absorbent from the still may be passed first countercurrently to the gas through the second contacting zone, and then passed concurrently with the feed gas through the first contacting or heat exchange zone. Where a two stream system is to be used, separate streams may be cycled from the still through the individual contacting zones.

Figure 2:
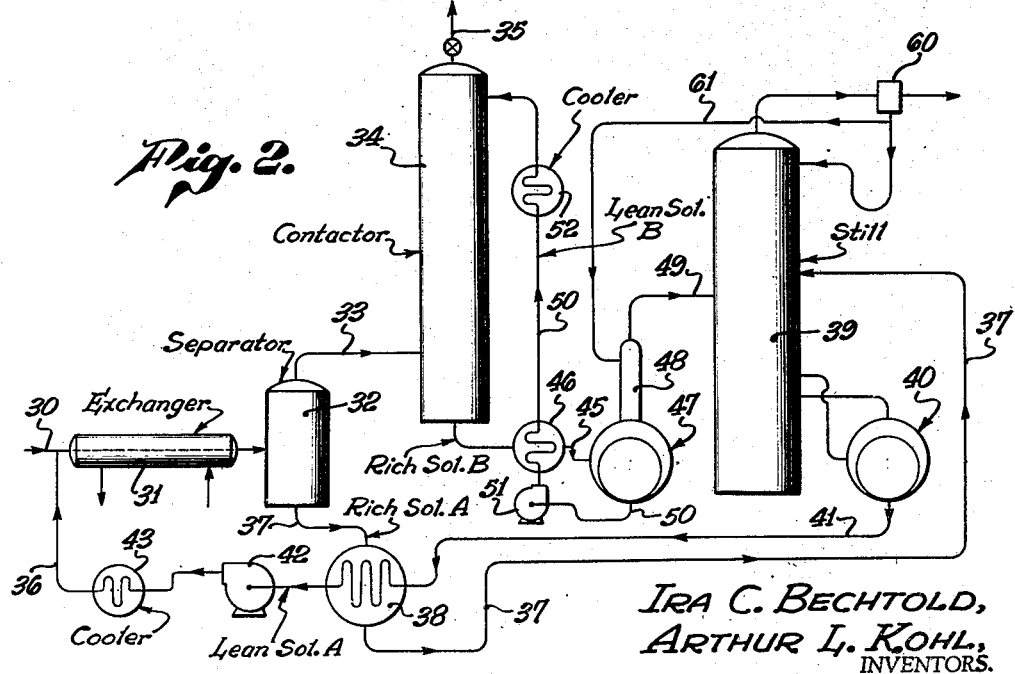

All the various objects and advantages of the invention, as well as the details of certain illustrative embodiments, will be more fully understood from the following detailed description of the accompanying drawings, in which:

Fig. 1 is a diagrammatic illustration in flow sheet form of one embodiment of the invention; and Fig. 2 is a similar view illustrating a variational process embodying the invention.

The gas to be treated in the system, typically a hydrocarbon refinery gas having high hydrogen sulfide content, with perhaps some carbon dioxide, is introduced through line 10 into one or a series of heat exchangers, typified by the showing of an exchanger at 11 to which cooling fluid, such as water, is introduced through line 12 and removed through line 13. From the exchanger, the residual gas flows through line 131 into separator 14 from which the gas flows through line 15 into a contacter column or second contacting zone 16. In flowing upwardly through the column, the gas is contacted by a down flowing stream of a lean absorbent solution, typically a solution of 50 to 75 percent amine (e. g. monoethanolamine) in water. In passing down through the contactor, the solution absorbs residual acidic constituents from the gas in an amount corresponding to say from 5 to 10 percent of the initial acidic constituent content of the gas, so that the gas leaving the contactor through line 17 has low or negligible hydrogen sulfide content.

From the base of the contactor the absorbent is discharged by pump 18 through line 19 to be admixed with sour gas flowing to the exchanger 11. During concurrent flow of the gas and absorbent through the exchanger, the bulk of the acidic constituents in the gas react with and become absorbed by the amine solution. The reaction results in the development of considerable heat which, in the absence of its transference to a cooling medium, would greatly lower the absorptive capacity of the amine solution. By circulating of cooling fluid through the exchanger 11 and in indirect heat exchange relation with the reacting gas and absorbent mixture, the temperature of the latter may be kept sufficiently low to permit absorption of the bulk of the hydrogen sulfide in this initial contacting stage.

In separator 14, the residual gas is separated from the rich absorbent, and the latter is discharged through line 20 and exchanger 21 to the usual amine regenerating still 22 wherein the solution is heated to drive off the absorbed acid gas through line 23. Condensate is returned from cooler 24 to the still through the reflux line 25. The heated lean absorbent, taken from the base of the still, or the conventionally illustrated reboiler 26 into line 27 to be discharged by pump 28 through exchanger 21 and cooler 29 to the contactor.

Fig. 2 illustrates a variational embodiment of the invention similar in general to the above described process but differing with respect to treatment of the gas in the two contacting zones with separate streams of the lean absorbent. As before the raw gas flows from line 30 through the water-cooled exchanger 31 into separator 32, the residual gas passing through line 33 into contactor 34 from which the gas leaves through line 35. At the inlet side of the exchanger, the gas is mixed with the liquid absorbent from line 36 which following concurrent flow and reaction with the acidic constituents of the gas in the exchanger, is taken from separator 32 through line 37 and exchanger 38 to the still 39. The lean solution after regeneration in the still and reboiler 40 is returned to the reactor exchanger by way of line 41, exchanger 38, pump 42, and cooler 43. In Fig. 2, the flow course of the absorbent being circulated between the exchanger and still, is designated as "Solution A."

The absorbent employed for second stage treatment of the gas is returned from the contactor 34 to a second reboiler 47 through line 45 and exchanger 46. Vapor from reboiler 47 passes through still 48 and line 49 to still 39. Still 48 is refluxed with condensate returned from the still condenser 60 through line 61. The lean solution from reboiler 47 is returned to contactor 34 by way of line 50, pump 51, exchanger 46 and cooler 52. The flow course of the second stage treating solution is indicated as "Solution B." The process of Figure 2 may be particularly adaptable where dehydration of the gas is desired, in which case diethylene glycol or other moisture absorbent material would be incorporated in Solution B.

The principal purposes of the second stage treatment of the gas in the contactor of Fig. 2 may be to remove any consequential quantities of acid gases remaining after the first stage treatment, recover any amine carryover from the separator, and produce dehydration of the gas. Treatment in the contactor of Fig. 1 serves only to remove any consequential quantities of acid gases.

In some instances it may be desirable to employ a water wash in the contactor or the top section thereof in order to prevent the loss of appreciable quantities of amine with the exit gas. Such a wash would be particularly applicable where a concentrated amine solution was used in the heat exchanger and dehydration was not desired.

As indicated, it may be desirable to dehydrate the gas along with removal of its acidic constituents. For this purpose we may employ an amine-glycol solution having a glycol concentration of absorbent in the proportions of glycol and amine individually in a range from about 40 to 60 percent. It is also contemplated that where a concentrated amine solution may be used, such solutions may be sufficiently moisture absorptive to substantially reduce the moisture content of the gas in passing through the contactor 34.

We claim:

1. The process of treating a gaseous mixture for the removal of an acidic constituent thereof constituting a high percentage of the mixture, that includes contacting the mixture and reacting the acidic constituent with a liquid basic absorbent in a first contacting zone to effect partial absorption of the acidic gas, simultaneously passing a cooling fluid in indirect heat exchange relation with the mixture in said zone to remove heat of reaction, separating the partially purified residual gases from the absorbent, contacting said residual gases with an absorbent of the same composition in a second contacting zone, heating and regenerating the absorbent, and returning the regenerated absorbent to said zones.

2. The process of treating a gaseous mixture for the removal of an acidic constituent thereof constituting a high percentage of the mixture, that includes flowing the mixture concurrently with a liquid basic absorbent through a contacting zone and therein reacting the acidic constituent with the absorbent to effect partial absorption of the acidic gas, simultaneously passing a cooling fluid in indirect heat exchange relation with the mixture in said zone to remove heat of reaction, separating the partially purified residual gases from the absorbent, flowing the residual gases through a second zone in contact with a countercurrently flowing stream of an absorbent of the same composition, heating and regenerating the absorbent, and returning the regenerated absorbent to said zones.

3. The process of treating a gaseous mixture for the removal of a contained acidic gas constituting a high percentage of the mixture, that includes flowing the gas through a first contacting zone concurrently with a liquid basic absorbent reactive with the acidic gas in said zone to effect partial absorption of the acidic gas, separating the partially purified residual gas and absorbent, passing a cooling fluid in heat transferring relation with the mixture in said zone, contacting a rising stream of said residual gas with a down-flowing stream of the absorbent in a second contacting zone, heating and regenerating the absorbent, and returning the regenerated absorbent to said zones.

4. The process of treating a gaseous mixture for the removal of acidic gas constituting a high percentage of the mixture, that includes flowing the gas through a first contacting zone concurrently with a liquid basic absorbent reactive with the acidic gas in said zone to effect partial absorption of the acidic gas, separating the partially purified residual gas and absorbent, passing a cooling fluid in heat transferring relation with the mixture in said zone, contacting a rising stream of said residual gas with a down-flowing stream of the absorbent in a second contacting zone, heating and regenerating the absorbent, and cooling and returning separate streams of the regenerated absorbent to said zones.

5. The process of treating a gaseous mixture for the removal of an acidic constituent of the group consisting of hydrogen sulfide and carbon dioxide constituting a high percentage of the mixture, that includes flowing the gas together with a liquid amine solution concurrently through a heat exchanger and therein reacting said acidic constituent with the amine to effect partial absorption of the acidic gas, simultaneously passing a cooling fluid in indirect heat exchange relation with the reacting mixture, separating the partially purified residual gas from the amine solution, heating and regenerating the amine, and returning the regenerated amine to said heat exchanger.

6. The process of treating a gaseous mixture for the removal of an acidic constituent of the group consisting of hydrogen sulfide and carbon dioxide constituting a high percentage of the mixture, that includes flowing the gas together with a liquid amine solution concurrently through a heat exchanger zone and therein reacting said acidic constituent with the amine to effect partial absorption of the acidic gas, simultaneously passing a cooling fluid in indirect heat exchange relation with the reacting mixture, separating the partially purified residual gases from the amine solution, contacting said residual gas with the amine solution in a contacting zone, heating and regenerating the amine, and returning the regenerated amine to said heat exchanger and contacting zones.

7. The process of treating a gaseous mixture for the removal of an acidic constituent of the group consisting of hydrogen sulfide and carbon dioxide constituting a high percentage of the mixture, that includes flowing the gas together with a liquid solution containing in excess of 50% amine concurrently through a heat exchanger zone and therein reacting said acidic constituent with the amine to effect partial absorption of the acidic gas, simultaneously passing a cooling fluid in indirect heat exchange relation with the reacting mixture, separating the partially purified residual gas from the amine solution, contacting said residual gas with the amine solution in a contacting zone, heating and regenerating the amine, and returning the regenerated amine to said heat exchanger and contacting zones.

8. The process of treating a gaseous mixture for the removal of an acidic constituent of the group consisting of hydrogen sulfide and carbon dioxide constituting a high percentage of the mixture, that includes passing the gas through a first zone and then through a second zone, introducing to said second zone a liquid amine absorbent and therein contacting a rising stream of the gas with a down-flowing stream of the absorbent, then passing the absorbent with the gas through said first zone to effect partial absorption of the acidic gas, passing a cooling fluid in indirect heat transferring relation with the mixture flowing through said second zone, separating the partially purified absorbent from the residual gas flowing between said zones, heating and regenerating the absorbent, and returning the regenerated absorbent to said second zone.

IRA C. BECHTOLD.
ARTHUR L. KOHL.

REFERENCES CITED

The following references are of record in the file of this patent:

UNITED STATES PATENTS

| Number | Name | Date |
|---|---|---|
| 2,177,068 | Hutchinson | Oct. 24, 1939 |
| 2,477,314 | Scharmann | July 26, 1949 |

OTHER REFERENCES

"Triethanolamine—An Absorbent for Acid Gases," July 1, 1930, Carbide and Carbon Chem. Corp., 30 E. 42nd St., N. Y., N. Y.